United States Patent [19]
Alberti et al.

[11] Patent Number: 6,145,936
[45] Date of Patent: Nov. 14, 2000

[54] SPOKE WHEEL FOR A TUBELESS TIRE

[75] Inventors: Alberto Alberti, Verbania; Pierandrea Cappelletti, Como, both of Italy

[73] Assignee: Aprilia World Service B.V., Rotterdam, Netherlands

[21] Appl. No.: 09/325,768

[22] Filed: Jun. 4, 1999

[30] Foreign Application Priority Data

Jun. 5, 1998 [IT] Italy .................................. PN98U0031

[51] Int. Cl.[7] .............................. B60B 1/02; B60B 21/00
[52] U.S. Cl. .............................. 301/58; 301/56; 301/59; 301/97
[58] Field of Search .................................. 301/95, 96, 97, 301/98, 55, 56, 58, 59, 61, 104

[56] References Cited

U.S. PATENT DOCUMENTS

| | | | |
|---|---|---|---|
| 478,064 | 6/1892 | Metz | 301/55 |
| 478,394 | 7/1892 | Bretz | 301/56 |
| 486,146 | 11/1892 | Westwood et al. | 301/97 |
| 633,542 | 9/1899 | Whitely | 301/59 |
| 734,588 | 7/1903 | Miller | 301/56 |
| 735,145 | 8/1903 | Pound et al. | 301/56 |
| 1,239,794 | 9/1917 | Keating | 301/56 |
| 1,949,695 | 3/1934 | Shoemaker | 301/55 |
| 1,954,445 | 4/1934 | Farr | 301/58 |
| 4,626,036 | 12/1986 | Hinsberg et al. | 301/58 |
| 4,978,176 | 12/1990 | Smith | |
| 5,429,421 | 7/1995 | Watson | |
| 5,882,088 | 3/1999 | Yahata | 301/59 |
| 6,068,348 | 5/2000 | Okajima et al. | 301/58 |

FOREIGN PATENT DOCUMENTS

| | | |
|---|---|---|
| 0 143 394 | 6/1985 | European Pat. Off. |
| 2 347 209 | 11/1977 | France |
| 17 18 046 | 1/1956 | Germany |
| 59-118501 | 7/1984 | Japan |
| 60-259501 | 12/1985 | Japan |

*Primary Examiner*—S. Joseph Morano
*Assistant Examiner*—Long Bao Nguyen
*Attorney, Agent, or Firm*—Wenderoth, Lind & Ponack, L.L.P.

[57] ABSTRACT

A spoke wheel is provided which includes a hub and a rim concentric with the hub about an axis of rotation. The rim is connected to the hub by a plurality of detachable spokes. The rim has a first tubular portion, a second tubular portion, a first flange, and a second flange. The first tubular portion is arranged between the first flange and a wheel center plane which is perpendicular to the axis of rotation of the wheel. The second tubular portion is arranged between the second flange and the wheel center plane. Each of the tubular portions has an outer lateral wall having a plurality of throughholes for the detachable spokes. Each of the throughholes has a longitudinal axis aligned with the longitudinal axis of each of the detachable spokes.

20 Claims, 3 Drawing Sheets

SPOKE WHEEL FOR A TUBELESS TIRE

BACKGROUND OF THE INVENTION

The present invention relates to a spoke wheel for a tubeless tire and, in particular, a tubeless tire for motorcycles and similar vehicles.

Spoke wheels, which are wheels having a plurality of detachable spokes connecting a rim to a hub, have been in use for a long time. However, spoke wheels have not achieved a large acceptance, primarily because of problems in their design. For example, a spoke wheel designed to be sturdy (i.e., have a high resistance to radial and tangential stresses received from a tire, and a high resistance to stresses received from the spokes), but also light and easy to manufacture is particularly difficult to achieve. These difficulties have become magnified since the introduction of tubeless tires. This is due to the fact that the spokes, whether or not they are provided with fastening nipples, may create problems with the airtight seal of the tire when received in mounting holes provided in the well of the rim.

One type of spoke wheel which is specifically designed for tubeless tires is disclosed in Utility Model DE-GM 1718046. This spoke wheel has a rim having lateral flanges for retaining a tire. The rim is also provided with cantilevered extensions which protrude outward from the lateral flanges. These cantilevered extensions are adapted to receive an end of each of the spokes, preferably the end provided with a fastening nipple. Although these spoke wheels have a unique visual aspect due to the cantilevered extension, the wheel is not very sturdy unless high grade and very expensive metal alloys are used. This is because the stresses received from the spokes are carried by cantilevered and relatively weak portions of the rim.

Another, more recent, example of a spoke wheel for tubeless tires in disclosed in patent EP-B-0 143 394. The rim for a spoke wheel of this type is illustrated in FIG. 1, which shows a cross section of the wheel in a radial plane of the rim. Reference to this figure provides a useful comparison for the present invention.

Rim 1 for this spoke wheel has a profile conforming to European Tire and Rim Technical Organization (ETRTO) standards. Rim 1 comprises a pair of flanges 2, 3 abutting against beads of an outer side of a tire T, a pair of associated base walls 4, 5 which are adapted to carry the inner circumference of the beads, and a well 6 connecting the base walls 4, 5 to one another. Flanges 2, 3 must have a very large thickness so that a plurality of bore holes 9, which extend obliquely from the center plane P of the wheel, can be drilled in the flanges 2, 3. These bore holes 9 are for mounting therein end 7 (which has no nipple) of each of the spokes 8. The spokes 8 extend in a rectilinear direction to a ring-like extension of a concentric hub, and are fastened to the hub extension by nipples screwed at their second end (not shown). This spoke wheel may have some increased sturdiness. However, the wheel is markably heavy and may consequently have an undesirably high cost.

Another spoke wheel is disclosed in published Japanese patent abstract JP 60 259501. This reference discloses a spoke wheel including a rim having a main body, a pair of ear portions, and a pair of hollow portions provided on each side of the main body. Each of the ear portions include several throughholes which pass through the ear portions in a lateral (sideways) direction. In other words, the throughholes have a longitudinal axis that is substantially perpendicular to the longitudinal axis of each spoke which connects the rim to a wheel hub. Consequently, fastening the rim end of the each of the spokes to the rim is not easy due to the orientation of the throughholes. Moreover, because of the orientation of the throughholes, the rim ends of each of the spokes may contact the outer surface of the beads of a tire installed on the rim. Hence, the ends of the spokes may cause damage to the tire.

SUMMARY OF THE INVENTION

Consequently, it is an object of the present invention to provide a spoke wheel which is suitable for tubeless tires, and which is both sturdy and lightweight. Furthermore, it is an object of the present invention to provide a spoke wheel which can be manufactured efficiently and at a low cost.

The spoke wheel of the present invention comprises a hub and a rim concentric with the hub about an axis of rotation. The rim is connected to the hub by a plurality of detachable spokes. The rim includes a first tubular portion, a second tubular portion, a first flange, and a second flange. The first tubular portion is arranged between the first flange and a wheel center plane that is perpendicular to the axis of rotation of the wheel. The second tubular portion is arranged between the second flange and the wheel center plane. Each of the tubular portions has an outer lateral wall having a plurality of throughholes for the detachable spokes. Each of the throughholes has a longitudinal axis aligned with a longitudinal axis of each of the detachable spokes.

Due to the structure and arrangement of the present invention, the objects of the present invention have been met and the problems encountered in the prior art have been overcome.

BRIEF DESCRIPTION OF THE DRAWINGS

Features and advantages of the present invention will become more apparent from the following description and the attached drawings, wherein.

DETAILED DESCRIPTION OF THE INVENTION

Figure 1:
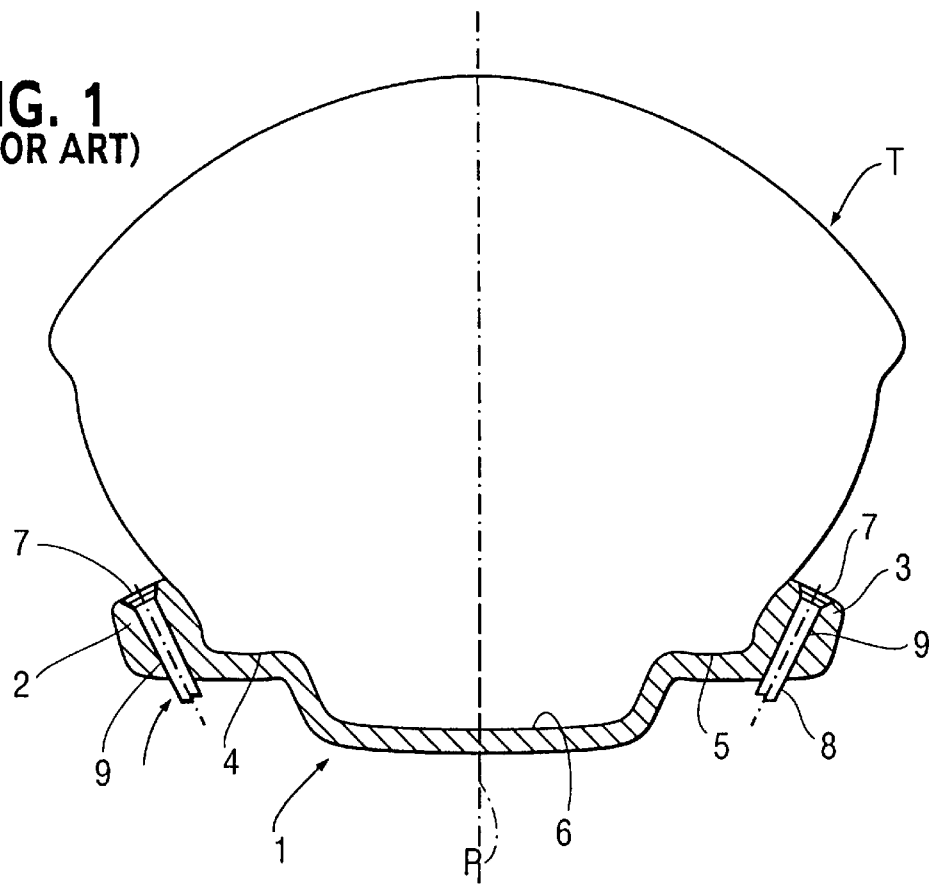
FIG. 1 is a cross sectional view of the rim of a spoke wheel found in the prior art.
Figure 2:
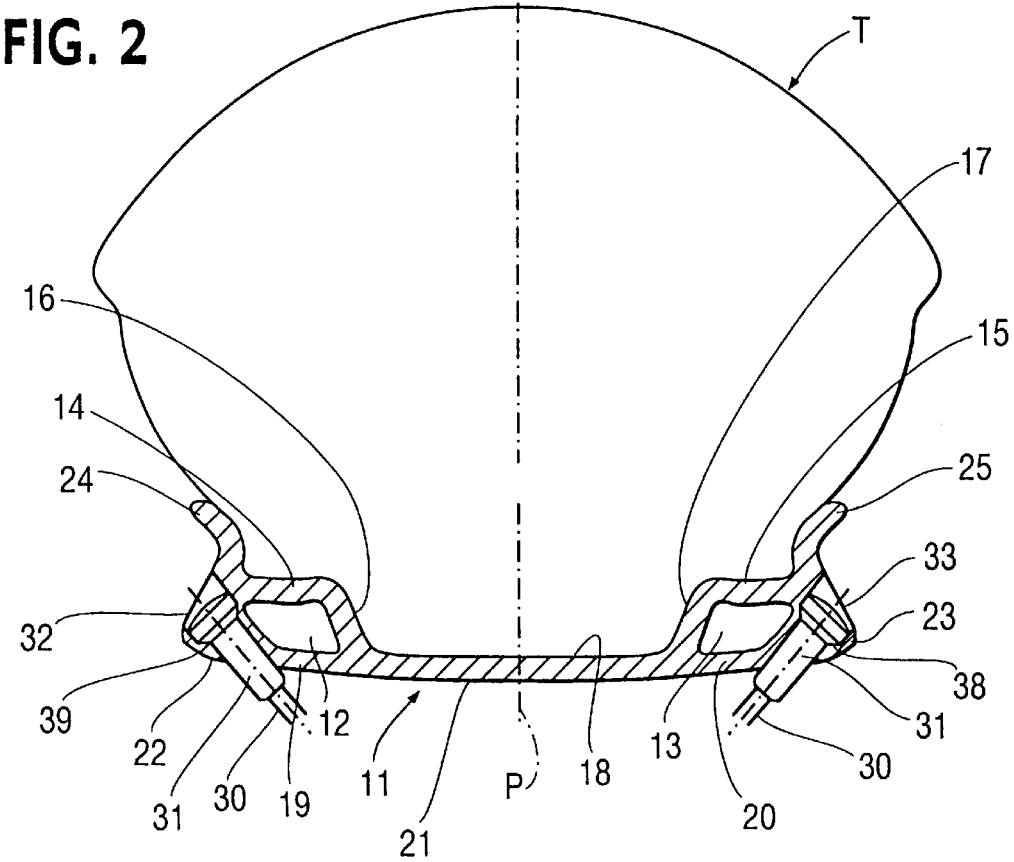
FIG. 2 is a cross sectional view showing the rim of a spoke wheel according to an embodiment of the present invention.

Referring to FIG. 2, the rim 11 of a spoke wheel according to the present invention has a profile conforming to ETRTO standards. The rim 11 includes a first tubular portion 12 and a second tubular portion 13, both of which are substantially four-sided. The rim also includes a first flange 24 and a second flange 25 which retain the beads of a tire T in symmetrical positions with respect to a center plane P which is perpendicular to the axis of rotation of the wheel. The rim 11 also includes a well 18, and the first and second tubular portions 12, 13 are provided on opposite outer sides of well 18. The first and second tubular portions 12, 13 comprise: inner lateral walls 16, 17 (which they share with well 18); base walls 14, 15 which carry the inner circumference of the beads of a tire T; bottom walls 19, 20 which are extensions of bottom wall 21 of well 18; and outer lateral walls 22, 23. The outer lateral walls 22, 23 connect the first and second flanges 24, 25 to the bottom walls 19, 20. Each of the first and second tubular portions 12, 13 are arranged between first and second flanges 24, 25 (which are extensions of outer lateral walls 22, 23) and center plane P.

In the present invention, straight throughholes 32, 33 with beveled shoulders 38, 39 are drilled in the outer lateral walls 22, 23 of the first and second tubular portions 12, 13. A plurality of detachable spokes 30 connect the rim 11 to a hub (not shown in FIG. 2). A first end of each of the detachable spokes 30 is connected to the rim 11 at one of the throughholes 32, 33. In one embodiment, the first end of each of the detachable spokes has a threaded portion for fastening nipples 31, and the beveled shoulder 38, 39 of each of the throughholes acts as a seat for each of the nipples 31. Thereby, the first end of each of the detachable spokes 30 is retained in one of the throughholes 32, 33. As shown in FIG. 2, each of the throughholes 32, 33 has a longitudinal axis aligned with the longitudinal axis of one of the detachable spokes 30.

Because the throughholes are located in the outer lateral walls 22, 23 of the first and second tubular portions 12, 13, the first end of each of the detachable spokes 30 is connected to a sturdy portion of the rim 11. Furthermore, because the longitudinal axis of each of the throughholes 32, 33 is aligned with the longitudinal axis of each of the detachable spokes 30, installation and removal of each of the detachable spokes 30 to/from the rim 11 is fast and efficient. Moreover, because the throughholes 31, 32 are aligned with the longitudinal axis of each of the spokes through an outer lateral wall 22, 23 and therefore do not pass through the rim 11 in a lateral (axial) direction, there is no potential damage to the tire and no potential problems with the airtight seal between the rim 11 and the tire.

According to another embodiment of the present invention, rim 11 can be formed from an extruded light alloy material which is shaped into rim 11 as one piece. The ends of the extruded light alloy material can be connected with a butt weld. Consequently, the rim 11 is simple and cheap to manufacture.

Figure 3:
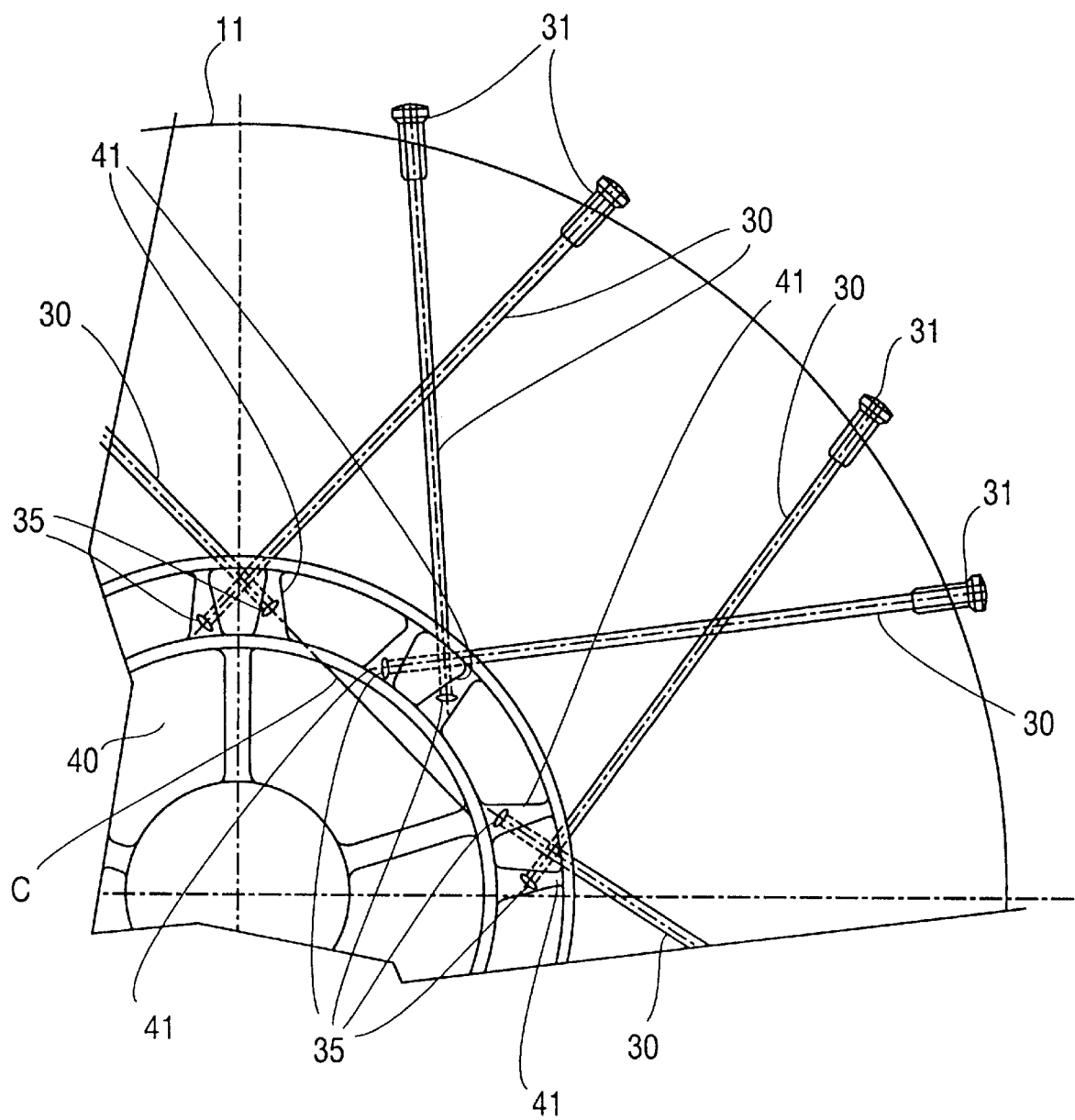
FIG. 3 is a partial side view of a spoke wheel according to an embodiment of the present invention, which view depicts the connection of spokes to a hub.

FIG. 3 shows one embodiment of the present invention in which the detachable spokes 30 are attached to radial extensions 41 of hub 40. Suitable throughholes (not shown) are drilled in the radial extension 41 so that a second end 35 of each of the detachable spokes 30 can be connected to the hub 40. In this embodiment, the second end 35 is aligned with a longitudinal axis of each of the detachable spokes 30 so that each of the spokes 30 is straight throughout its entire length. Each of the detachable spokes 30 extends from the extension 41 of hub 40 along a direction of a geometric chord C which joins two points on a circumferential surface of hub 40. Consequently, each of the detachable spokes 30 may extend from the hub 40 in a substantially radial direction.

Figure 4:
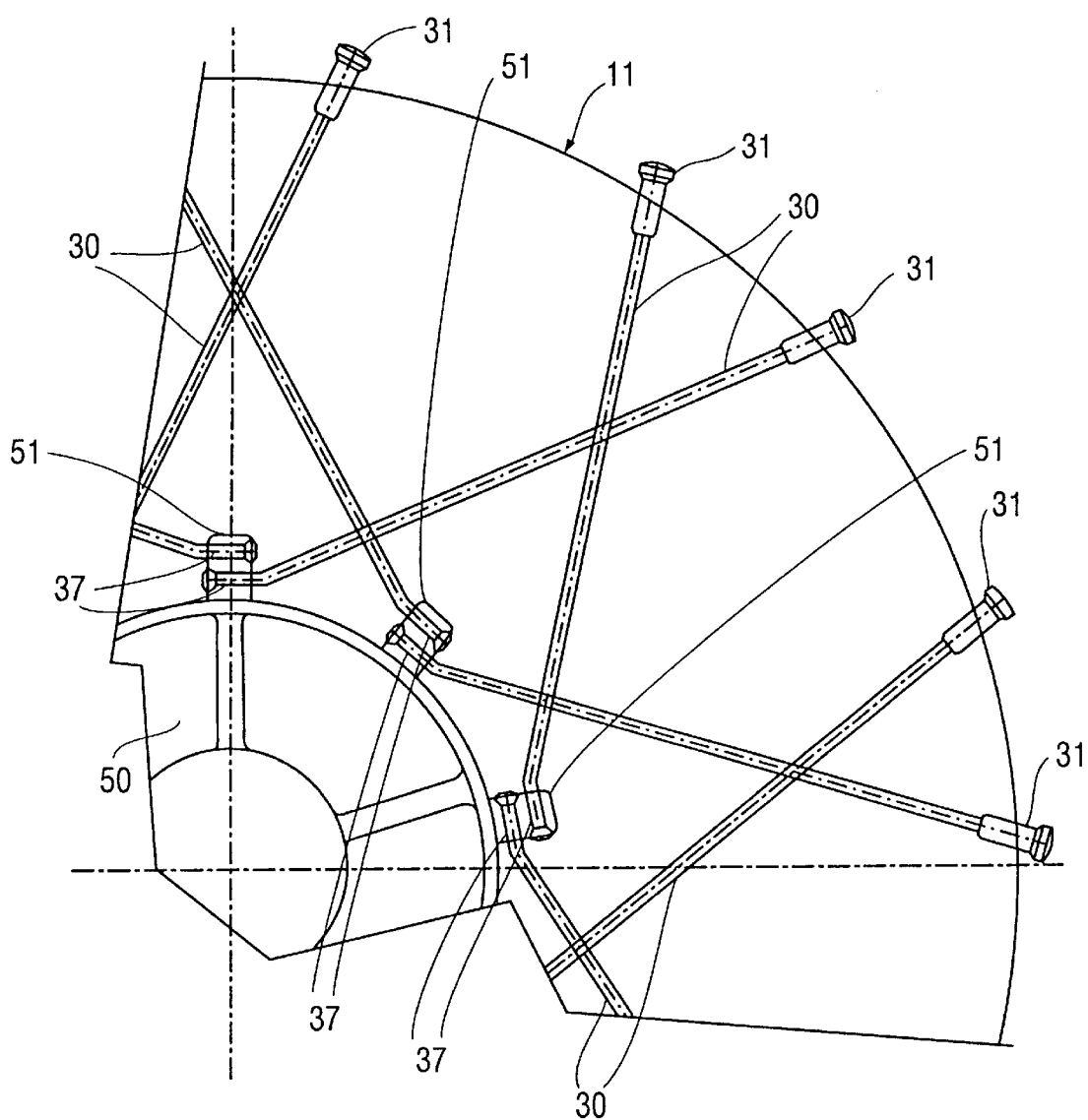
FIG. 4 is a partial side view of a spoke wheel according to another embodiment of the present invention, which view depicts an alternate connection of spokes to a hub.

FIG. 4 shows another embodiment of the present invention and, in particular, an alternate means of connecting the second end of each of the detachable spokes 30 to a hub 50. In this embodiment, the second end 37 of each of the detachable spokes 30 is formed at an angle of about 20–45° with respect to the longitudinal axis of each of the detachable spokes 30 (including the first end). The second end 37 of each of the detachable spokes 30 is attached to the hub 50 such that the second end 37 extends from the hub in a substantially tangenitial direction. The second ends 37 can therefore be attached in pairs to radial extensions 51 of hub 50 by being fitted into suitable throughholes (not shown) in each of the radial extensions 51.

The structure and arrangement of the present invention provides many benefits. Due to the throughholes arranged in the outer lateral walls 22, 23 of the rim having a longitudinal axis aligned with a longitudinal axis of each of the detachable spokes, fastening of the first end of each of the detachable spokes 30 to the rim 11 is fast and efficient. Furthermore, contact between the end of the spokes and the beads of a tire, which could cause damage to the tire, is avoided.

In addition, the first and second tubular portions 12, 13 create a considerable increase in the moment of inertia of the spoke wheel and, in particular, the rim 11. This enable the rim 11 to absorb high stresses transmitted from both the tire and the detachable spokes 30.

An additional advantage of the present invention is that the first and second tubular portions 12, 13 provide increased strength of the rim 11, while significantly reducing the overall weight of the spoke wheel. In addition, the tubular portions 12, 13 are formed so that two of the walls of each tubular portion (specifically, inner lateral walls 16, 17 and base walls 14, 15) are arranged so as to form a portion of a rim profile which complies with ETRTO standards.

An additional advantage of the present invention can be achieved when the rim 11 is formed from an extruded light alloy material. Consequently, the rim can be formed more efficiently, and manufacturing cost will be lowered.

An additional advantage of the present invention is found in the accessibility of nipples 31 which are attached to the first end of each of the detachable spokes 30. The nipples 31 are arranged at an outer periphery of the rim and are threaded onto the first end of each of the detachable spokes 30. The accessibility and threaded connection of the nipples to the detachable spoke make the wheel easy to manufacture.

Although the invention has been described in connection with specific embodiments, it will be readily apparent to those skilled in the art that various changes in form and arrangement of parts may be made to suit specific requirements without departing from the spirit and scope of this invention. For example, not all of the described advantages and structural features may be needed, or some additional structural elements may be added. For example, nipples may be screwed to the second end of each of the detachable spokes 30 fastened to the hub.

We claim:

1. A spoke wheel comprising:
   a hub;
   a rim concentric with said hub about an axis of rotation, said rim being connected to said hub by a plurality of detachable spokes;
   wherein said rim has a first tubular portion, a second tubular portion, a first flange, a second flange, and a wheel center plane perpendicular to the axis of rotation, said first tubular portion being arranged between said first flange and the wheel center plane, and said second tubular portion being arranged between said second flange and the wheel center plane;
   wherein each of said tubular portions has an outer lateral wall, each of said outer lateral walls having a plurality of throughholes for said plurality of detachable spokes, each of said throughholes having a longitudinal axis aligned with a longitudinal axis of each respective detachable spoke.

2. The spoke wheel of claim 1, wherein each of said detachable spokes has a first end, a second end, and a removable nipple threaded on said first end attaching each of said detachable spokes to said rim at said throughholes.

3. The spoke wheel of claim 2, wherein said second end of each of said detachable spokes is attached to said hub such that each of said detachable spokes extends from said hub along a direction of a chord of said hub.

4. The spoke wheel of claim 3, wherein each of said detachable spokes extends from said hub in a substantially radial direction.

5. The spoke wheel of claim 2, wherein said second end of each of said detachable spokes is attached to said hub such that said second end of each of said detachable spokes extends from said hub in a substantially tangenitial direction.

6. The spoke wheel of claim 5, wherein said second end of each of said detachable spokes forms an angle with said first end of each of said detachable spokes.

7. The spoke wheel of claim 1, wherein said rim includes a circumferential well, said first tubular portion and said second tubular portion being provided on opposite outer sides of said well.

8. The spoke wheel of claim 7, wherein each of said tubular portions has a base wall for carrying beads of a tire, an inner lateral wall, a bottom wall extending from a bottom wall of said well, and said outer lateral wall connecting one of said flanges to said bottom wall.

9. The spoke wheel of claim 1, wherein each of said tubular portions is four-sided.

10. The spoke wheel of claim 9, wherein said rim includes a circumferential well, each of said tubular portions having a base wall for carrying beads of a tire, an inner lateral wall, a bottom wall extending from a bottom wall of said well, and said outer lateral wall connecting one of said flanges to said bottom wall.

11. The spoke wheel of claim 1, wherein said rim includes a circumferential well, each of said tubular portions having a base wall for carrying beads of a tire, an inner lateral wall, a bottom wall extending from a bottom wall of said well, and said outer lateral wall connecting one of said flanges to said bottom wall.

12. The spoke wheel of claim 11, wherein each of said detachable spokes has a first end and a second end, said second end of each of said detachable spokes being attached to said hub such that each of said detachable spokes extends from said hub along a direction of a chord of said hub.

13. The spoke wheel of claim 12, wherein said second end of each of said detachable spokes extends from said hub in a substantially radial direction.

14. The spoke wheel of claim 11, wherein each of said detachable spokes has a first end and a second end, said second end of each of said detachable spokes being attached to said hub such that said second end of each of said detachable spokes extends from said hub in a substantially tangential direction.

15. The spoke wheel of claim 14, wherein said second end of each of said detachable spokes forms an angle with said first end of each of said detachable spokes.

16. The spoke wheel of claim 1, wherein each of said detachable spokes has a first end and a second end, said second end of each of said detachable spokes being attached to said hub such that each of said detachable spokes extends from said hub along a direction of a chord of said hub.

17. The spoke wheel of claim 16, wherein said second end of each of said detachable spokes extends from said hub in a substantially radial direction.

18. The spoke wheel of claim 1, wherein each of said detachable spokes has a first end and a second end, said second end of each of said detachable spokes being attached to said hub such that said second end of each of said detachable spokes extends from said hub in a substantially tangenitial direction.

19. The spoke wheel of claim 18, wherein said second end of each of said detachable spokes forms an angle with said first end of each of said detachable spokes.

20. The spoke wheel of claim 1, wherein said rim is formed from an extruded light alloy material.

* * * * *